(12) United States Patent
Nelson

(10) Patent No.: US 8,213,562 B2
(45) Date of Patent: Jul. 3, 2012

(54) CONTROL ROD BLADE EXTENSION FOR A NORDIC NUCLEAR REACTOR

(75) Inventor: Dennis S. Nelson, Wilmington, NC (US)

(73) Assignee: GE-Hitachi Nuclear Energy Americas, LLC, Wilmington, NC (US)

( * ) Notice: Subject to any disclaimer, the term of this patent is extended or adjusted under 35 U.S.C. 154(b) by 674 days.

(21) Appl. No.: 12/482,512

(22) Filed: Jun. 11, 2009

(65) Prior Publication Data

US 2010/0316179 A1    Dec. 16, 2010

(51) Int. Cl.
*G21C 7/00* (2006.01)
(52) U.S. Cl. ......................................... 376/327; 376/233
(58) Field of Classification Search .................. 376/327, 376/233
See application file for complete search history.

(56) References Cited

U.S. PATENT DOCUMENTS

| | | | |
|---|---|---|---|
| 3,480,510 A * | 11/1969 | Anthony | 376/219 |
| 4,631,165 A | 12/1986 | Wilson et al. | |
| 4,676,948 A | 6/1987 | Cearley et al. | |
| 4,711,756 A * | 12/1987 | Nakazato | 376/327 |
| 4,902,470 A | 2/1990 | Dixon et al. | |
| 6,418,178 B1 * | 7/2002 | Kobsa | 376/233 |

* cited by examiner

*Primary Examiner* — Ricardo Palabrica
(74) *Attorney, Agent, or Firm* — Ryan Alley Intellectual Property Law

(57) ABSTRACT

An embodiment of the present invention takes the form of an apparatus or system that may incorporate a single component to connect the control rod blade to the control rod drive system (CRD) of a Nordic-type of BWR. An embodiment of the present invention may eliminate the need of using multiple components to connect the control rod blade with the CRD.

10 Claims, 5 Drawing Sheets

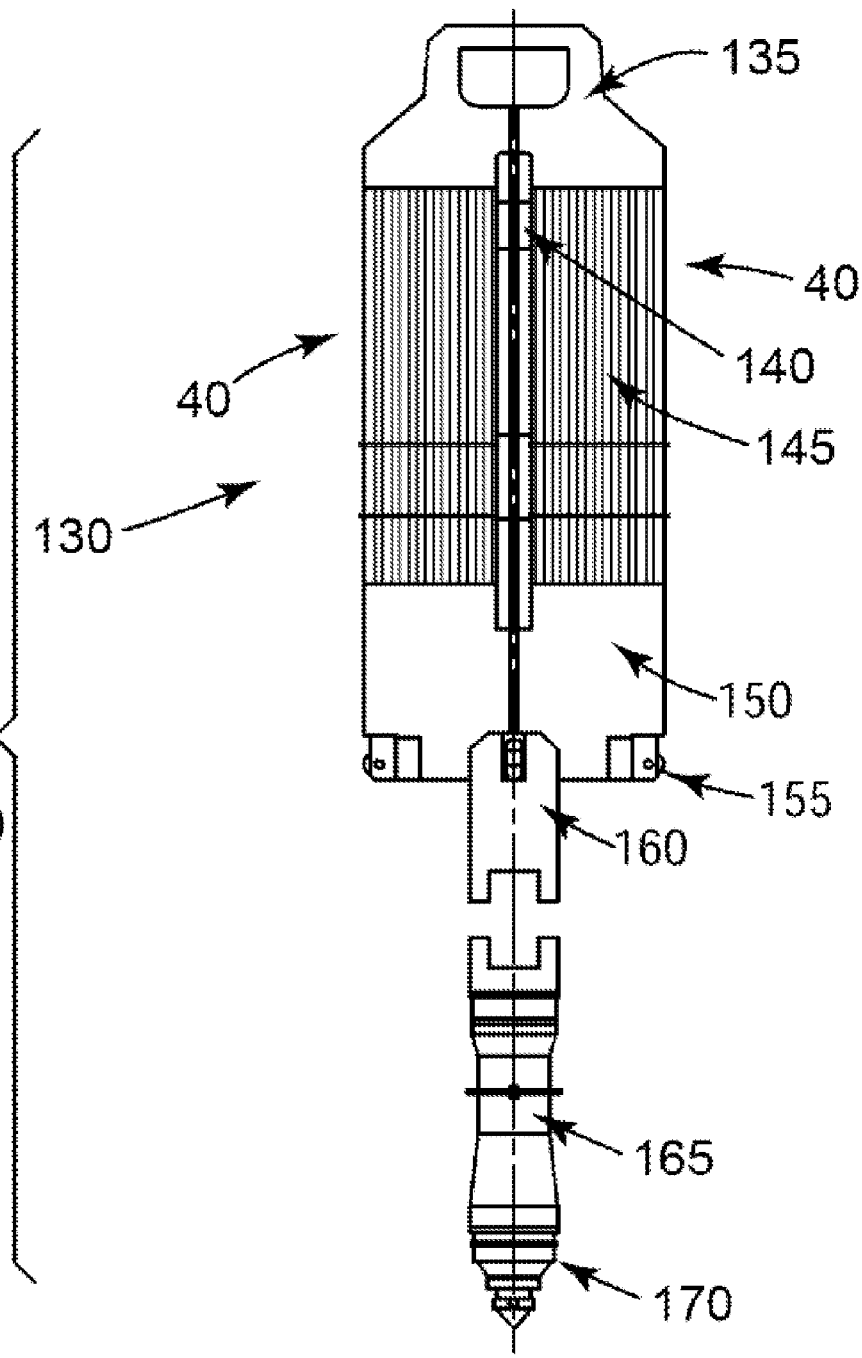

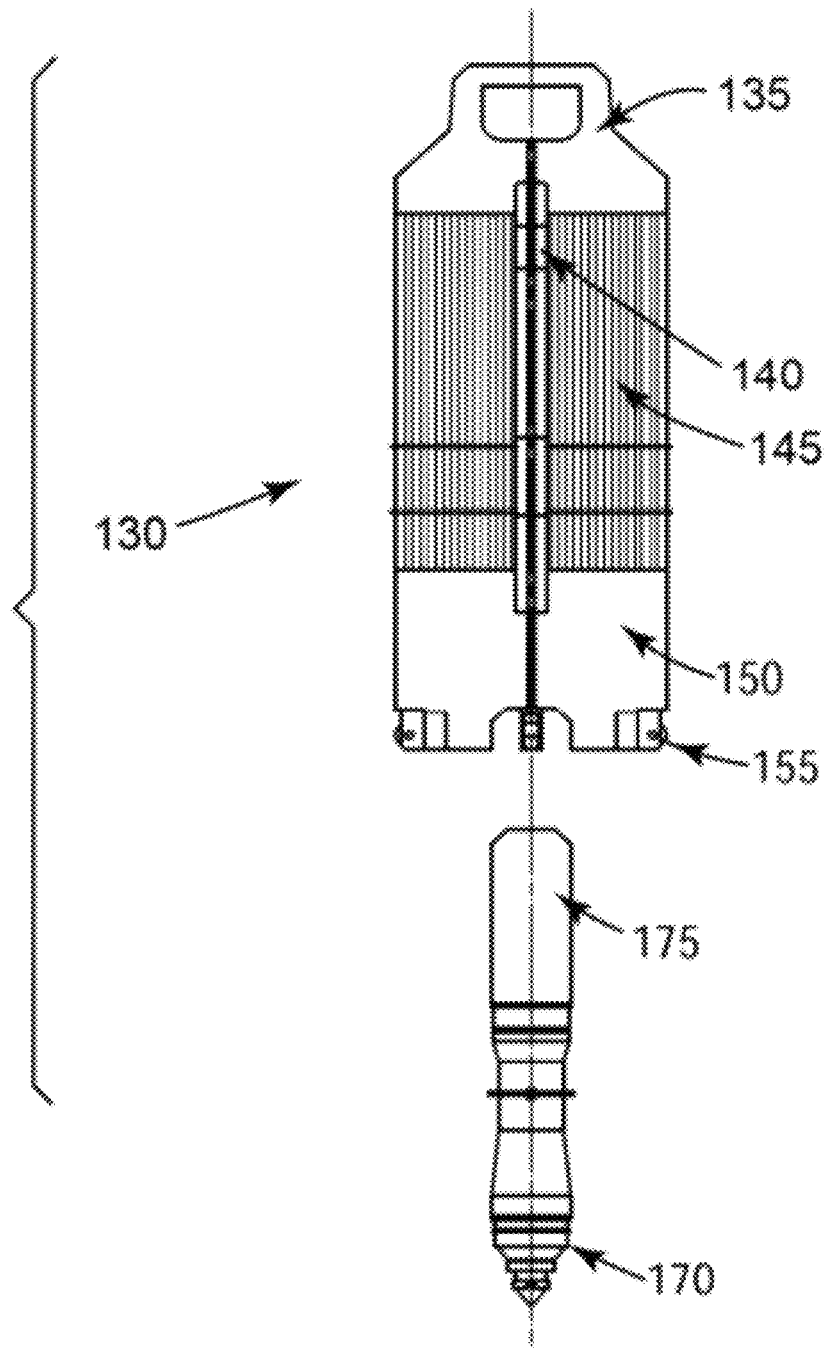

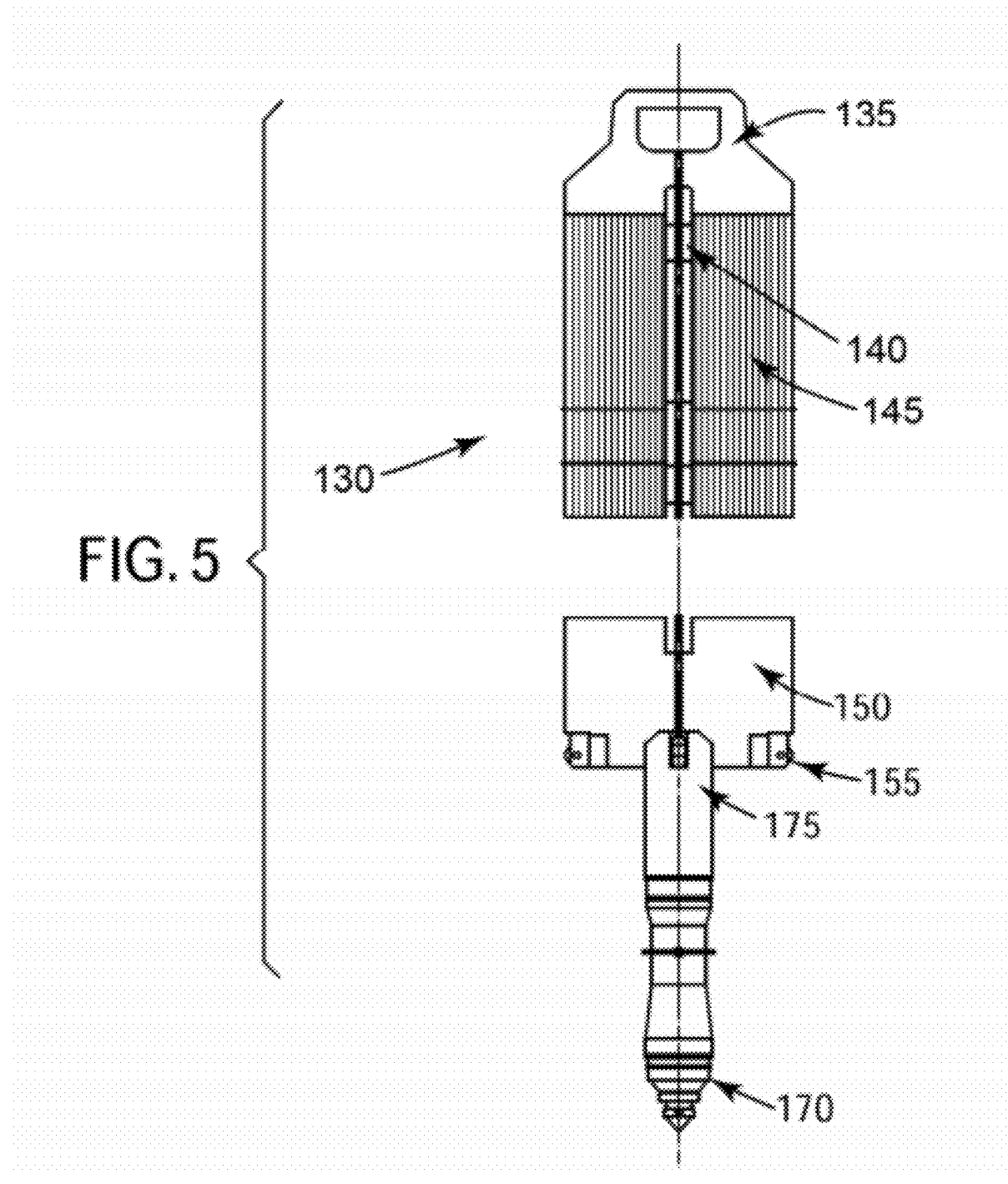

CONTROL ROD BLADE EXTENSION FOR A NORDIC NUCLEAR REACTOR

BACKGROUND OF THE INVENTION

The present invention relates generally to the control rods of a Nordic-type nuclear reactor pressure vessel; and more particularly to the extension or lower portion of replacement control rods that connects the control rod to the control rod drive.

As may be appreciated in the art, Nordic-types of boiling water reactors (BWRs) have unique attributes such as, but not limiting of: characteristics, design features, and dimensions. These attributes tend to vary greatly when compared to non-Nordic type BWRs.

A non-limiting example of a Nordic-type BWR is shown in FIG. 1. A typical BWR includes: a reactor pressure vessel (RPV) 10, a core shroud 30 disposed within the RPV 10, and a nuclear fuel core 35. The core shroud 30 is a cylinder that surrounds the nuclear fuel core 35, which includes a plurality of fuel bundle assemblies 40 disposed within the core shroud 30. A top guide 45 and a core plate 50 supports each of the fuel bundle assemblies 40.

An annular region between the core shroud 30 and the RPV 10 is considered the downcomer annulus 25. Coolant water flows through the downcomer annulus 25 and into the core lower plenum 55. Feedwater enters the RPV 10 via a feedwater inlet 15 and is distributed circumferentially within the RPV 10 by a feedwater sparger 20, which is adjacent a core spray line 105. Then, the water in the core lower plenum 55 flows upward through the nuclear fuel core 35. In particular, water enters the fuel bundle assemblies 40, wherein a boiling boundary layer is established. A mixture of water and steam exits the nuclear fuel core 35 and enters the core upper plenum 60 under the shroud head 65. The steam-water mixture then flows through standpipes 70 on top of the shroud head 65 and enters the steam separators 75, which separate water from steam. The separated water is recirculated to the downcomer annulus 25 and the steam exits the RPV 10 via a nozzle 110 for use in generating electricity and/or in another process.

As illustrated in FIG. 1, a conventional jet pump assembly 85 comprises a pair of inlet mixers 95. Each inlet mixer 95 has an elbow welded thereto, which receives pressurized driving water from a recirculation pump (not illustrated) via an inlet riser 100. Some inlet mixers 95 comprise a set of five nozzles circumferentially distributed at equal angles about an axis of the inlet mixer 95. Here, each nozzle is tapered radially and inwardly at the nozzle outlet. This convergent nozzle energizes the jet pump assembly 85. A secondary inlet opening (not illustrated) is located radially outside of the nozzle exit. Therefore, as jets of water exit the nozzles, water from the downcomer annulus 25 is drawn into the inlet mixer 95 via the secondary inlet opening, where mixing with water from the recirculation pump occurs.

The BWR also includes a coolant recirculation system, which provides the forced convection flow through the nuclear fuel core 35 necessary to attain the required power density. A portion of the water is drawn from the lower end of the downcomer annulus 25 via a recirculation water outlet 80 and forced by the recirculation pump into a plurality of jet pump assemblies 85 via recirculation water inlets 90. The jet pump assemblies 85 are typically circumferentially distributed around the core shroud 30 and provide the required reactor core flow. A typical BWR has between sixteen to twenty-four inlet mixers 95.

FIG. 2 is a schematic illustrating an example of a control rod blade 130 in accordance with an embodiment of the present invention. During the operation of the BWR, a control rod drive system (CRD) 120 maneuvers a control rod blade 130 to obtain an optimum power density. The control rod blade 130 typically is surrounded by a plurality of fuel bundle assemblies 40. As illustrated in FIG. 2, the control rod blade 130 typically has a cross or cruciform traverse cross-section. Here, the fuel bundle assemblies 40 surround the control rod blade 130, which may be positioned in the center of the fuel bundle assemblies 40.

The BWR is typically refueled periodically with an excess of reactivity sufficient to maintain operation throughout an operating cycle. During refueling, the RPV 10 is shutdown and some of the fuel bundle assemblies 40 are replaced. In a Nordic-type BWR the fuel bundle assemblies 40 are of the bottom entry type. The CRD 120 is used to remove the spent control rod blades 130 and to then insert the replacement control rod blades 130.

The CRD 120 connects to the control rod blade 130 in order to maneuver the fuel bundle assemblies 40. The control rod blade 130 may be considered a removable component of the Nordic-type of BWR. Moreover, the CRD 120 may be considered a stationary/fixed component of the Nordic-type of BWR.

Known systems of connecting the control rod blade 130 to the CRD 120 typically comprise multiple components. Some of the known systems use non-welded pin joint(s) to connect the multiple components. Some other known systems weld the multiple components together.

There are a few possible problems with the currently known apparatuses and systems for connecting the control rod blade 130 with the CRD 120. Currently known systems may require multiple repairs to the non-welded pin joint(s) or the welded joint. Currently known systems may also experience repeated structural issues with non-welded pin joints (s) or the welded joint. These apparatuses and systems also require longer time to replace the control rod blade 130 and may also expose operators to longer periods of radioactivity.

Based on the above discussion, operators of Nordic-type of BWRs may desire a new or improved apparatus and system for connecting the control rod blade 130 to the CRD 120. The apparatus and system should not require non-welded pin-joints or welds. The apparatus and system should require fewer parts than currently known systems, and allow for a simplified manufacturing process.

BRIEF DESCRIPTION OF THE INVENTION

In accordance with an embodiment of the present invention, an apparatus for connecting components of a Nordic nuclear reactor pressure vessel (RPV), the apparatus comprising: an adapter for connecting a removable component of a RPV with a permanent component of the RPV; wherein the adapter comprises a first end that integrates with the permanent component and an opposite second end that integrates with the removable component, and wherein the adapter supports the weight of the removable component as the removable component is linearly moved.

In accordance with an alternate embodiment of the present invention, a system for moving a plurality of fuel bundles of a Nordic reactor pressure vessel (RPV) of a nuclear powerplant, the system comprising: a) a control rod blade (CRB), wherein the CRB secures a plurality of fuel bundles; b) a control rod drive system configured for linearly moving the CRB; and c) an adapter configured for connecting the control drive system to the CRB.

BRIEF DESCRIPTION OF THE DRAWING

FIG. 3 is a schematic, illustrating a partially exploded view of a known system for connecting a control rod blade to a control rod drive system of the Nordic-type boiler water reactor of FIG. 1.

FIG. 4 is a schematic illustrating a partially exploded view of an embodiment of a system for connecting a control rod blade to a control rod drive system, in accordance with an embodiment of the present invention.

FIG. 5 is a schematic illustrating a partially exploded view of an embodiment of a system for connecting a control rod blade to a control rod drive system, in accordance with an alternate embodiment of the present invention.

DETAILED DESCRIPTION OF THE INVENTION

Certain terminology may be used herein for convenience only and is not to be taken as a limitation on the invention. For example, words such as "upper", "lower", "left", "front", "right", "horizontal", "vertical", "upstream", "downstream", "fore", "aft", "top" and "bottom" merely describe the configuration shown in the FIGS. Indeed, the components may be oriented in any direction and the terminology, therefore, should be understood as encompassing such variations unless specified otherwise.

As used herein, an element or step recited in the singular and preceded with "a" or "an" should be understood as not excluding plural elements or steps, unless such exclusion is explicitly recited. Furthermore, references to "an embodiment" of the present invention are not intended to exclude additional embodiments incorporating the recited features and/or elements.

The following discussion focuses on an embodiment of the present invention applied to the control rod blade 130 and the control rod drive system (CRD) 120 of a Nordic-type of BWR. Other embodiments of the present invention may be integrated with other systems used to connect a removable structure with a fixed structure.

An embodiment of the present invention takes the form of an apparatus or system that may incorporate a single component to connect the control rod blade 130 to the CRD 120 of a Nordic-type of BWR. An embodiment of the present invention may eliminate the need of using multiple components to connect the control rod blade 130 with the CRD 120.

Figure 1:
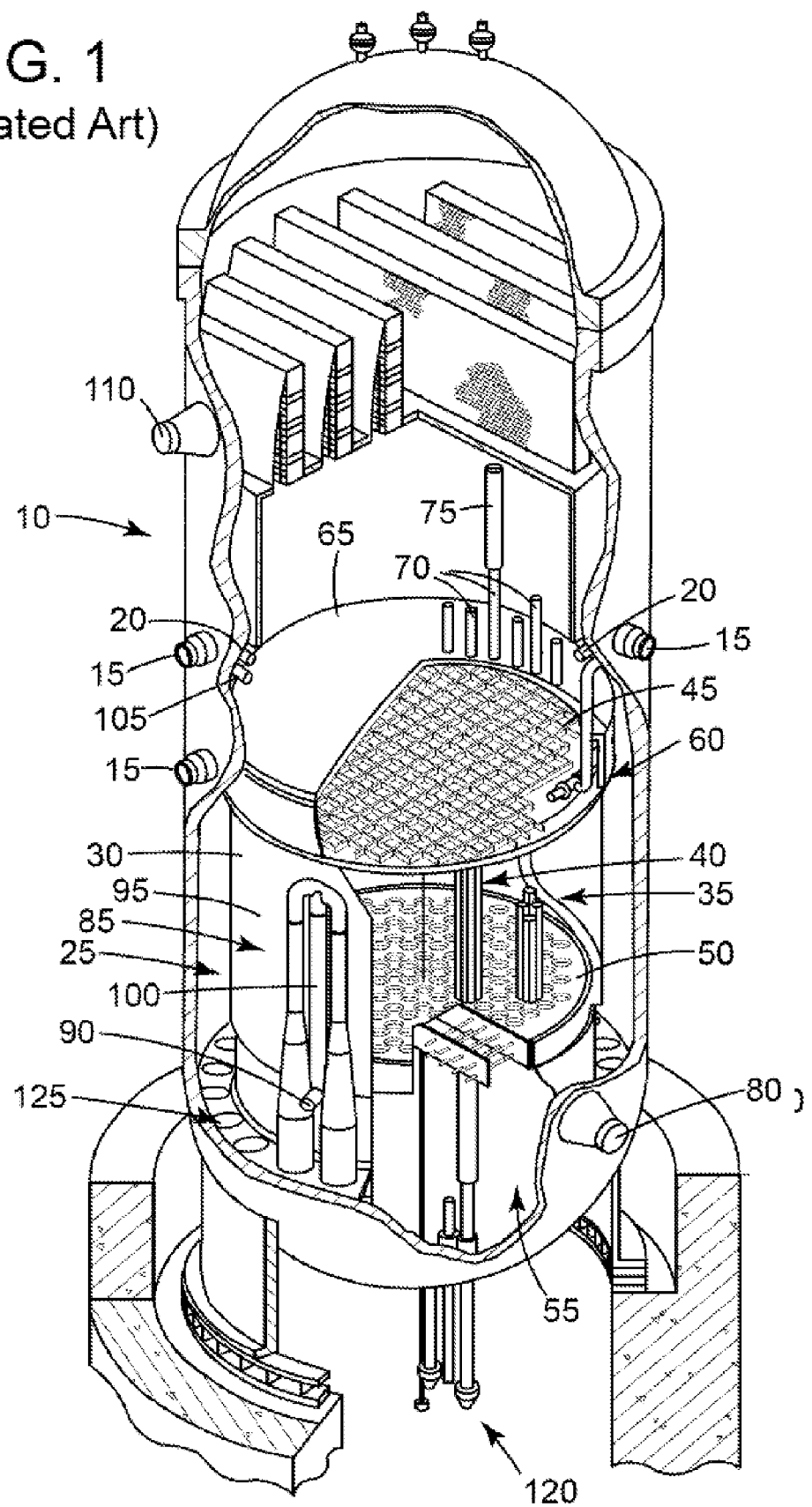
FIG. 1 is a schematic, illustrating a Nordic-type boiling water reactor partially in cross-section, within, which an embodiment of the present invention operates.
Figure 2:
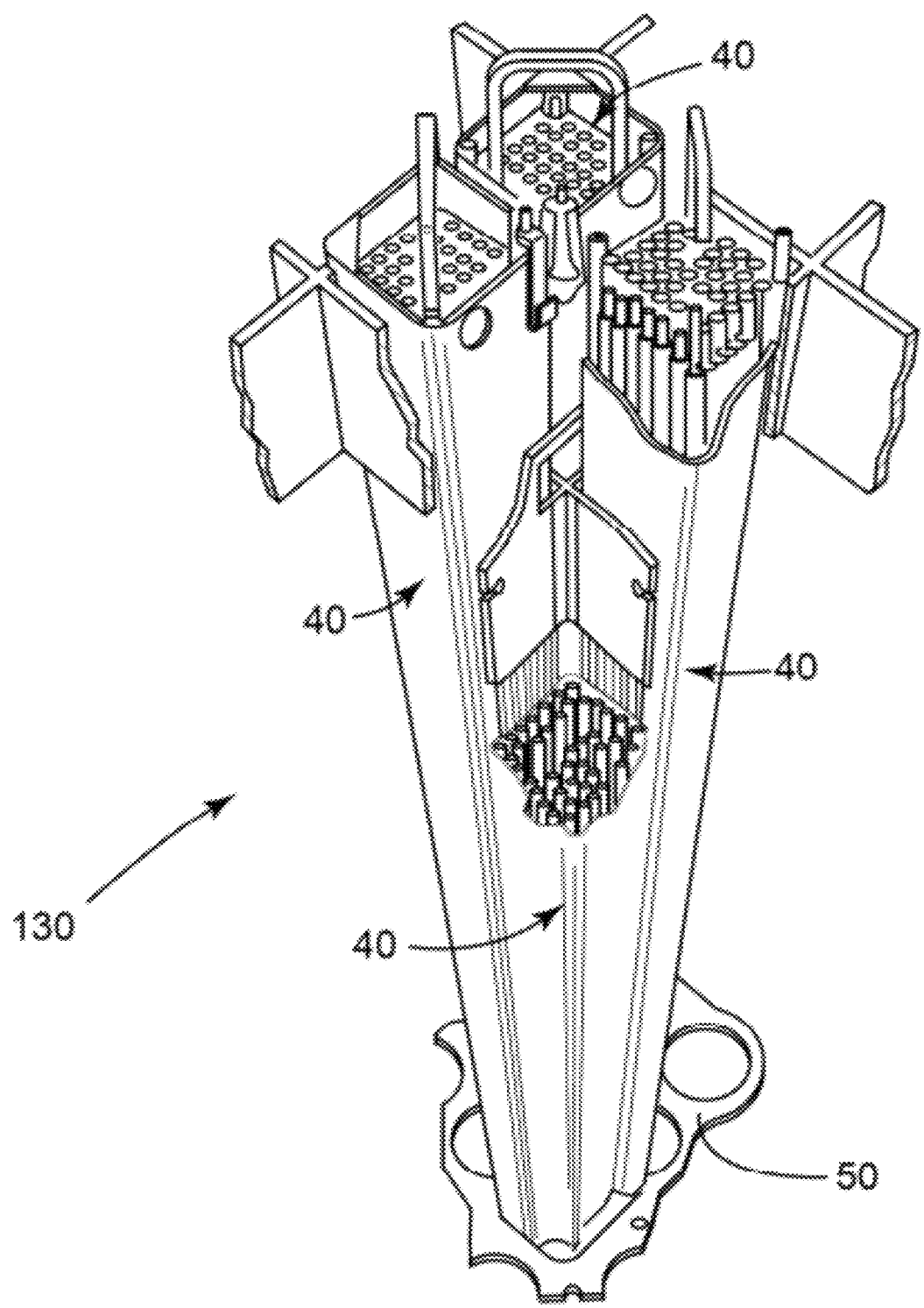
FIG. 2 is a schematic, illustrating an isometric view of a control rod blade of the Nordic-type boiler water reactor of FIG. 1.

Referring again to the FIGS., where the various numbers represent like parts throughout the several views. FIG. 3 is a schematic, illustrating a partially exploded view of a known system for connecting a control rod blade 130 to a control CRD 120 of the Nordic-type BWR of FIG. 1. Some known systems for may use a connector 160 and an extension 165 to connect the control rod blade 130 to the CRD 120. The connector 160 may be considered a short cylindrical member that links the fin assembly 150 to the extension 165. The extension 165 may be considered a long cylindrical member that links the control rod blade 130 to the CRD 120. The connector 160 and the extension 165 are connected to allow for the CRD 120 to linearly move the control rod blade 130. The connector 160 and the extension 165 are commonly formed or partially hollow structures that allow for welded or non-welded connections.

An embodiment of the control rod blade 130 may comprise: a handle 135, located at a top portion of the control rod blade 130; a tie rod 140; an absorber section 145, which comprises neutron absorber material for shutdown and power control of the BWR and may comprise a cruciform shape; and a fin assembly 150 located at a bottom portion of the control rod blade 130, which provides a transition from the absorber section 145 to a cylindrical connector 160. The fin assembly 150 may comprise a roller 155 configured for assisting with positioning the fin assembly 150.

Under this known system, the connector 160 and extension 165 needs to be joined to connect the control rod blade 130 with the CRD 120. As illustrated in FIG. 3, the connector 160 may be integrated with a bottom portion of the fin assembly 150 and the extension 165 may be connected to a top portion of the CRD 120 via a fastener 170. As discussed, the connector 160 and the extension 165 may be joined via a non-welded or welded process. Also, for the non-welded version, before a control rod blade 130 may be replaced, this known system requires that the connector 160 and the extension 165 are: a) joined to the bottom of the fin assembly 150 and the top of the CRD 120, respectively; and then h) the connector 160 and the extension 165 are connected. This process may add considerable time to the refueling process.

As described below, embodiments of the present invention may simplify the process of exchanging the control rod blade 130. Embodiment of the present invention may require fewer components and less time to remove a spent control rod blade 130 and to install a fresh control rod blade 130. Essentially, embodiments of the present invention combine the connector 160 and the extension 165 to form an adapter 175, which may be a single-piece, combined connector and extension.

FIG. 4 is a schematic illustrating a partially exploded view of an embodiment of a system for connecting a control rod blade 130 to a control rod drive system 120, in accordance with an embodiment of the present invention. FIG. 4 is similar to FIG. 3, which may be used for comparison purposes.

In this embodiment of the present invention the adapter 175 may have the form of a solid cylindrical shape. A first end of the adapter 175 may mate with a bottom portion of the fin assembly 150. A second end of the adapter 175 may connected to a top portion of the CRD 120 via the fastener 170, as described. In an embodiment of the present invention, an overall length of the adapter 175 comprises a range of from about 95 inches to about 105 inches and an outside diameter of from about 2.5 inches to about 3.5 inches.

In use, an embodiment of the present invention may be used connect a replacement control rod blade 130 to the CRD 120. Here, the replacement control rod blade 130 may be lowered into a fuel cell of the RPV 10. The first end of the adapter 175 may be connected, via a welding process, or the like, to a mating portion of the fin assembly 150. The second end of the adapter 175 may connect, via the fastener 170, to a top end of the CRD 120. Then, the CRD 120 may linearly raise the replacement control rod blade 130 into the nuclear fuel core 35 of the RPV 10. A user, may follow the aforementioned steps in a reverse order to disconnect a spent control rod blade 130 from the CRD 120.

FIG. 5 is a schematic illustrating a partially exploded view of an embodiment of a system for connecting a control rod blade 130 to a control rod drive system 120, in accordance with an alternate embodiment of the present invention. As illustrated FIG. 5, this alternate embodiment of the present invention may be to the embodiment discussed in FIG. 4. Therefore, the current discussion is limited to the features of this alternate embodiment.

This alternate embodiment of the present invention integrates the adapter 175 with the fin assembly 150. Here, a first end of the adapter 175 may be affixed to a bottom end of the fin assembly 150, via a process, such as, but not limiting of, welding. This feature may allow for easier mating between the adapter 175 and the control rod blade 130.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. Accordingly, we intend to cover all such modifications, omissions, additions and equivalents as may be included within the spirit and scope of the invention as defined by the following claims. For example, but not limiting of, an embodiment of the present invention may be used to: a) introduce a different vibration mode; b) to secure a pipe, cable, wire, or other similar object, at a fixed distance away from a separate structure or other object; or c) to apply a compressive load to at least one of the aforementioned objects.

What is claimed is:

1. A system for installing and operating a control rod blade in a Nordic reactor pressure vessel (RPV) of a nuclear powerplant, the system comprising:
    a control rod blade (CRB), wherein the CRB extends in an axial direction and includes a neutron absorber section and a single-piece lower fin joined directly below the neutron absorber section, wherein the lower fin includes a bottom terminal edge with a receptor, and wherein the entire control rod blade is shaped and sized to fit between a plurality of fuel bundles in the RPV;
    a control rod drive system configured for linearly moving the CRB in the axial direction; and
    an adapter having a single-piece construction, wherein,
    the single-piece adapter includes a top axial end shaped to directly mate with the receptor,
    the single-piece adapter includes a bottom axial end with a fastener that removably connects directly to the control rod drive,
    the single-piece adapter has an axial length spanning an entire distance between the receptor in the bottom terminal edge of the CRB and at least the top of the control rod drive, and
    the single-piece adapter is configured to connect the single-piece lower fin of the CRB and the control rod drive system via only the single-piece adapter.

2. The system of claim 1, wherein the CRB is cruciform and is configured to fit between the fuel bundles in to perpendicular transverse directions.

3. The system of claim 1, wherein the top axial end of the single-piece adapter is configured to be welded with the receptor in the bottom terminal edge of the control rod blade, and wherein the adapter supports a weight of the control rod blade as the control rod blade is moved in a linear motion.

4. The system of claim 3, wherein the single-piece adapter is cylindrical.

5. The system of claim 4, wherein the axial length of the single-piece adapter is about 95 inches to about 105 inches.

6. The system of claim 5, wherein the single-piece adapter has an outside cylindrical diameter of about 2.5 inches to about 3.5 inches.

7. A method of using the system of claim 1, the method comprising:
    lowering the CRB through the fuel bundles so that the receptor of the bottom terminal edge of the single-piece lower fin of the CRB is accessible below the fuel bundles;
    connecting the single-piece adaptor to the CRB by mating the top axial end of the single-piece adaptor directly to the receptor of the bottom terminal edge of the single-piece lower fin of the CRB; and
    removably attaching the bottom axial end of the single-piece adaptor directly to the control rod drive system.

8. The method of claim 7, wherein the mating includes welding the top axial end of the single-piece adaptor directly to the receptor of the bottom terminal edge of the single-piece lower fin of the CRB.

9. The method of claim 7, wherein the removably attaching includes fastening the bottom axial end of the single-piece adaptor directly to the control rod drive system.

10. The method of claim 7, further comprising:
    driving the control rod drive system to move the CRB in the axial direction.

* * * * *